United States Patent
Yamasaki et al.

(10) Patent No.: US 8,709,634 B2
(45) Date of Patent: Apr. 29, 2014

(54) BATTERY LOADING AND UNLOADING MECHANISM

(75) Inventors: Takayoshi Yamasaki, Tokyo (JP); Hiroaki Sato, Kanagawa (JP); Toshiaki Ueda, Saitama (JP); Tomonori Watanabe, Tokyo (JP); Yoichi Miyajima, Tokyo (JP); Osamu Nagashima, Tokyo (JP); Mieko Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 13/116,916

(22) Filed: May 26, 2011

(65) Prior Publication Data

US 2011/0287306 A1 Nov. 24, 2011

Related U.S. Application Data

(62) Division of application No. 11/722,917, filed as application No. PCT/JP2005/023627 on Dec. 22, 2005.

(30) Foreign Application Priority Data

Dec. 28, 2004 (JP) ................................. 2004-379984
Dec. 28, 2004 (JP) ................................. 2004-379985

(51) Int. Cl.
*H01M 2/10* (2006.01)
*H01M 2/00* (2006.01)

(52) U.S. Cl.
USPC .............................. 429/97; 429/100; 429/163

(58) Field of Classification Search
USPC .......................................... 429/96–100, 163
See application file for complete search history.

(56) References Cited

U.S. PATENT DOCUMENTS

| 5,208,116 A | 5/1993 | Joh |
| 2004/0058231 A1* | 3/2004 | Takeshita et al. ............. 429/123 |

FOREIGN PATENT DOCUMENTS

| JP | 05-012515 | 1/1993 |
| JP | 09-011759 | 1/1997 |
| JP | 11-3692 | 1/1999 |
| JP | 11-307072 | 11/1999 |
| JP | 2000-251861 | 9/2000 |
| JP | 3098951 | 10/2000 |
| JP | 2001-058332 | 3/2001 |

(Continued)

OTHER PUBLICATIONS

Machine Translation of JP H05-012515 originally published Jan. 1993 to Kitamura.*

*Primary Examiner* — Basia Ridley
*Assistant Examiner* — Jonathan G Leong
(74) *Attorney, Agent, or Firm* — Finnegan, Henderson, Farabow, Garrett & Dunner, L.L.P.

(57) ABSTRACT

In a battery loading and unloading mechanism, a battery formed in a flat rectangular parallelepiped and having an almost square main surface is loaded and unloaded to and from a device. The battery is formed with projecting portions at longitudinal both ends of a back surface thereof and along the back surface, whereby the battery can be prevented from being erroneously inserted into the device. The projecting portion has an inclined surface acutely inclined with respect to the back surface, and when the battery is unloaded from the device, unloading of the battery from the device is accelerated by the inclined surface undergoing contact pressure of the retaining means. The device is formed with a notched portion which is adapted to expose the other projecting portion of the battery when the battery is loaded, thereby facilitating unloading of the battery.

12 Claims, 13 Drawing Sheets

(56) References Cited

FOREIGN PATENT DOCUMENTS

| | | |
|---|---|---|
| JP | 2001-76700 | 3/2001 |
| JP | 2002-124229 | 4/2002 |
| JP | 2003-045390 | 2/2003 |
| JP | 2003-317689 | 11/2003 |
| JP | 2004-164979 | 6/2004 |
| JP | 2004-222654 | 8/2004 |

* cited by examiner

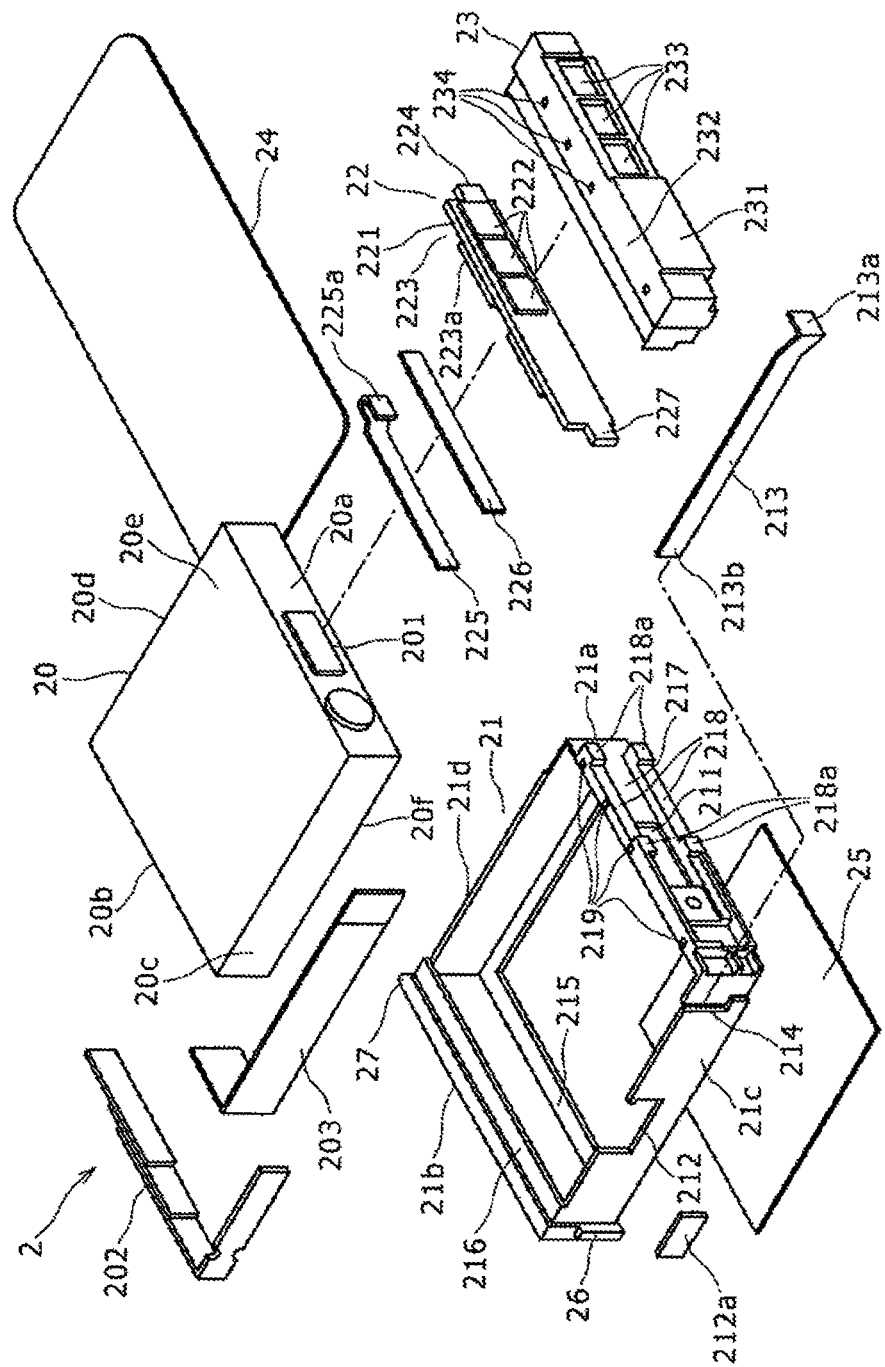

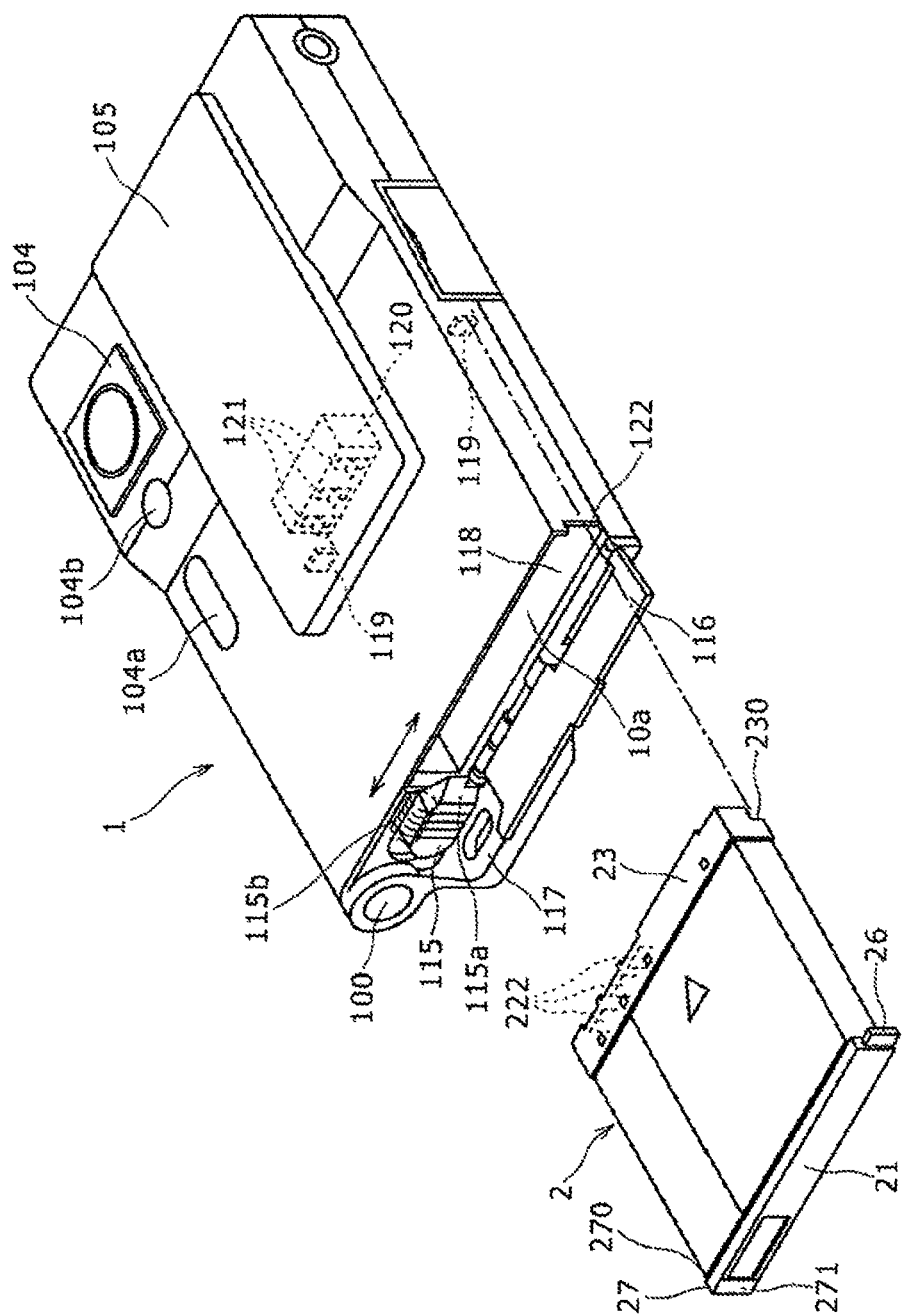

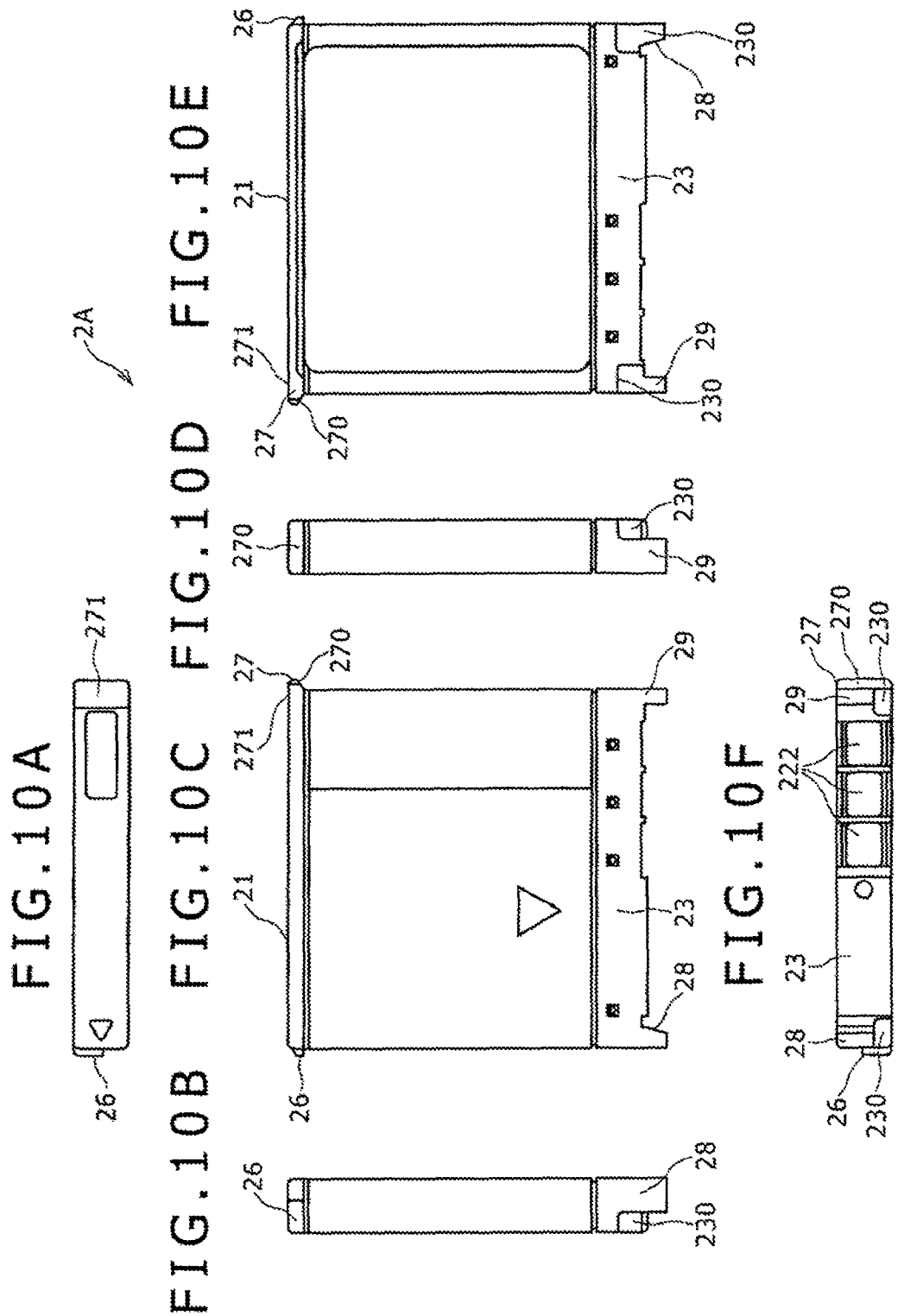

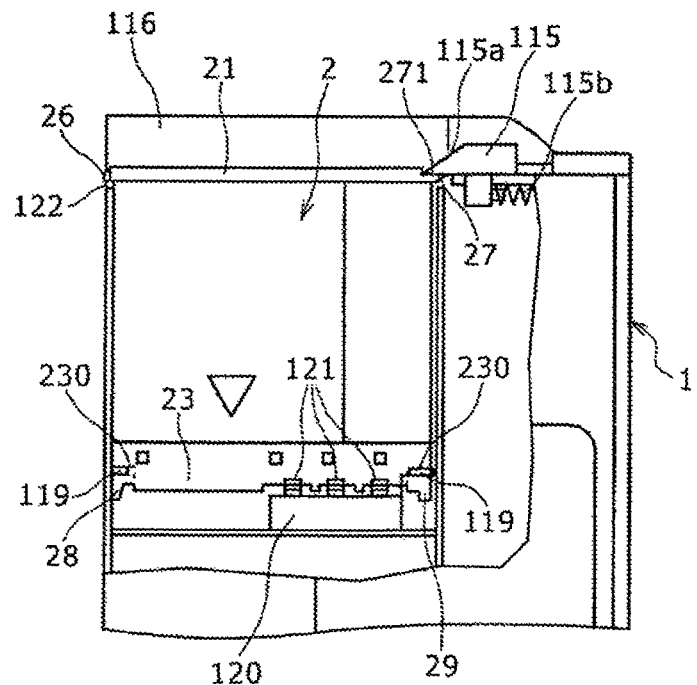
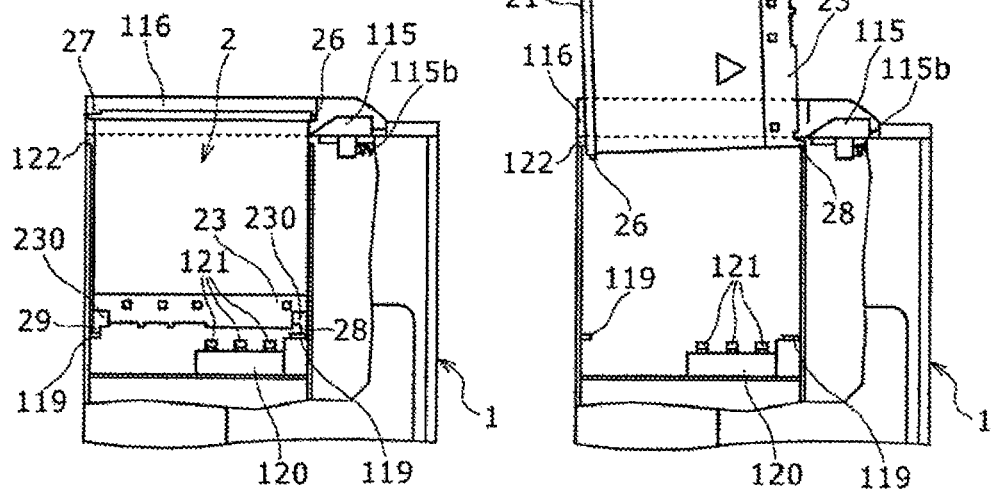

BATTERY LOADING AND UNLOADING MECHANISM

This application is a division of application Ser. No. 11/722,917, filed Mar. 17, 2008, which claims the benefit of priority to PCT/JP2005/023627, filed on Dec. 22, 2005, and Japanese Patent Application Nos. 2004-379985, filed on Dec. 28, 2004, and 2004-379984, filed on Dec. 28, 2004, the entire disclosures of which are incorporated herein by reference.

TECHNICAL FIELD

The present invention relates to a mechanism for loading and unloading a battery attached removably to a device which needs the battery.

BACKGROUND ART

As imaging devices represented by digital cameras have recently been reduced in size and weight, batteries loaded in the imaging devices have been forced in a rectangular parallelepiped advantageous in downsizing and weight saving. Imaging devices employing a battery need to be formed from a rigid member that withstands bending moment in order to prevent erroneous insertion of the battery or damage to the imaging device. This hinders the downsizing and weight saving.

To solve the problem, Japanese Patent Laid-open No. 2003-317689 shows a battery 14 as depicted in FIG. 14. This battery 14 is formed in a rectangular parallelepiped in which the length of an insertion-wise side is greater than that of a widthwise side to prevent erroneous insertion into an imaging device. In addition, an exterior package 140 of the battery is formed with notched portions 141 on its sides, which reliably prevents erroneous insertion and facilitates further downsizing and weight saving of imaging devices or the like attached with the battery 14, The exterior package 140 is provided with terminals 142 connected electrically to terminals of an imaging device attached with the battery 14. The number and positions of the notched, portions 141 to he formed are determined so that an end face 143 is asymmetrical. On the other hand, a battery holder in the imaging device adapted to house the battery 14 therein has almost the same inner shape as the outer shape of the exterior package 14. In addition, the battery holder is formed with projections each of which engages a corresponding one of the notched portions 141, 141 when the battery holder is housed therein. Incidentally, Japanese Patent Laid-open Nos. Hei 11-307072, 2001-76700 and Hei 11-3692 disclose batteries of the same type as that disclosed in Japanese Patent Laid-open No. 2003-317689.

It has recently been requested to reduce the size and weight of devices such as imaging devices equipped removably with a battery, which has need to further downsize batteries. To further downsize the rectangular parallelepipedic battery, it is only needed to form the battery to nave almost-square opposite surfaces. However, past batteries have no projections on lateral surfaces and the devices mentioned above have not clear retaining portions for retaining the battery received therein. For this reason, the users have not grasped the positional relationship between the battery and the retaining portions, leading to the high probability that the users erroneously insert the battery into the device mentioned above.

It is assumed that a battery is formed to have almost square surfaces and the respective terminal contacts of the battery and an imaging device are off-center. In this case, even if the battery is inserted upside down or laterally-erroneously inserted into the device, the terminals of the battery do not contact those of the device, that is, the battery does not electrically contact the device. However, a battery casing is liable to contact and damage the terminals of the device.

In view of the forgoing, the invention has been made and it is an aim of the present invention to provide a battery loading and unloading mechanism that can prevent erroneous insertion of a battery into a device resulting from downsizing of the battery attached removably to the device.

DISCLOSURE OF THE INVENTION

A battery loading and unloading mechanism according the present invention is a mechanism for loading and unloading a flat almost-rectangular parallepipedic battery to and from a device to be detachable equipped with the battery, and is distinctive in that the battery is formed with projecting portions at longitudinal both ends of a back surface thereof and along the back surface, the back surface being a surface opposite to an insertion surface of the battery inserted into the device, whereby even the battery formed in a flat rectangular parallelepiped and having the almost-square main surface can be prevented from being erroneously inserted into the device.

The battery loading and unloading mechanism of the present invention is distinctive in that the device includes retaining means for retaining the battery, one of the projecting portions of the battery has a to-be-retained surface retained by the retaining means, the to-be-retained surface is set to a level lower than the back surface, whereby a portion retained by the retaining means is made clear.

The battery loading and unloading mechanism of the present, invention is distinctive in that the to-be-retained surface is a surface having a frictional coefficient smaller than that of a portion of the back surface other than the to-be-retained surface, whereby the portion to be retained is made clearer and can foe more quickly retained.

The battery loading and unloading mechanism of the present invention is distinctive in that the projecting portion having the to-be-retained surface has an inclined surface acutely inclined with respect to the back surface, and when the battery is unloaded from the device, unloading of the battery from the device is accelerated by the inclined surface undergoing contact pressure of the retaining means.

The battery loading and unloading mechanism of the present invention is distinctive in that the device is formed with a notched portion which is adapted to receive and expose the other projecting portion of the battery at the time of loading the battery, thereby facilitating unloading of the battery.

The battery loading and unloading mechanism of the present invention is distinctive in that the battery is formed with projecting portions projecting in an inserting direction at both end portions of the insertion surface, thereby preventing damage to the battery and to a terminal of the device when the battery is erroneously inserted.

The battery may have an almost, square main surface.

The battery loading and unloading mechanism of the present invention described above can make clear a method of loading and unloading a battery to and from a device to be detachably equipped with the battery, whereby erroneous insertion of the battery into the device can be prevented.

Even the battery having an almost square main surface can foe prevented from being erroneously inserted. In addition, the battery and the terminal of a device attached with the battery can be protected, this device can be downsized, and mounting flexibility can be enhanced.

BRIEF DESCRIPTION OF THE DRAWINGS

[FIG. 1]

FIG. 1 includes schematic views depicting an embodiment of an imaging device attached with a battery of the present invention, in particular.

[FIG. 2]

FIG. 2 includes schematic views depicting an embodiment of the battery to be attached to the imaging device, and in particular.

[FIG. 3]

FIG. 3 is an exploded perspective view of the battery.

FIG. 4 is a schematic view depicting the inside of the imaging device housing the battery therein.

FIG. 5 is a schematic view of the imaging device attached with the battery.

[FIG. 6]

FIG. 6 is a view for assistance in explaining a procedure for inserting the battery into the imaging device.

FIG. 7 includes views for assistance in explaining inserting operation of the battery.

FIG. 8 includes views for assistance in explaining discharging operation of the battery.

FIG. 9 includes views for assistance in explaining operation for preventing erroneous insertion of the battery.

[FIG. 10]

FIG. 10 includes schematic views depicting an embodiment of a battery attached to an Imaging device, and in particular, FIGS. 10A through 10F are schematic views depicting lateral surfaces of the battery according to the embodiment.

FIG. 11 is a view for assistance in explaining a procedure for inserting the battery into the imaging device.

[FIG. 12]

FIG. 12A is a view for assistance in explaining operation for inserting the battery and FIGS. 12B and 12C are views for assistance in explaining operation for preventing erroneous insertion of the battery.

FIG. 13 is a schematic view depicting an embodiment of a locking claw.

FIG. 14 is a schematic view depicting an existing battery.

BEST MODE FOR CARRYING OUT THE INVENTION

Embodiments of the present invention will be hereinafter described with reference to the drawings.

Figure 1A:
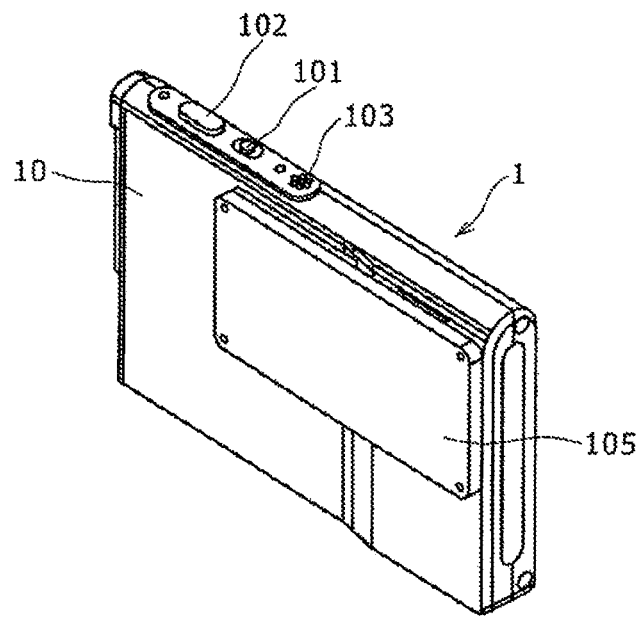
FIG. 1A is a schematic view depicting the front of the imaging device.
Figure 1B:
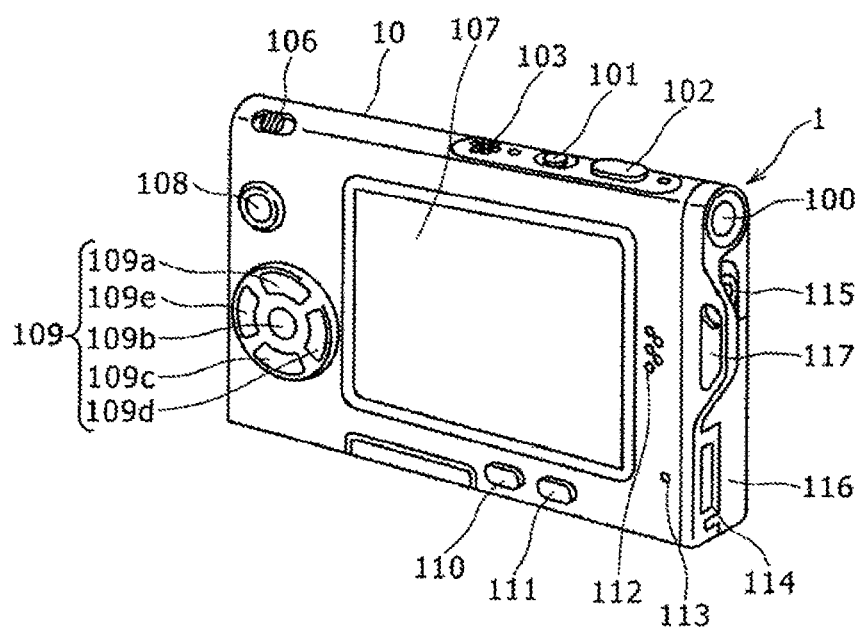
FIG. 1B is a schematic view depicting the back of the imaging device.
Figure 2A:
FIGS. 2A through 2F are schematic views depicting the lateral surfaces of the battery according to the embodiment.
Figures 2B, 2C, 2D:
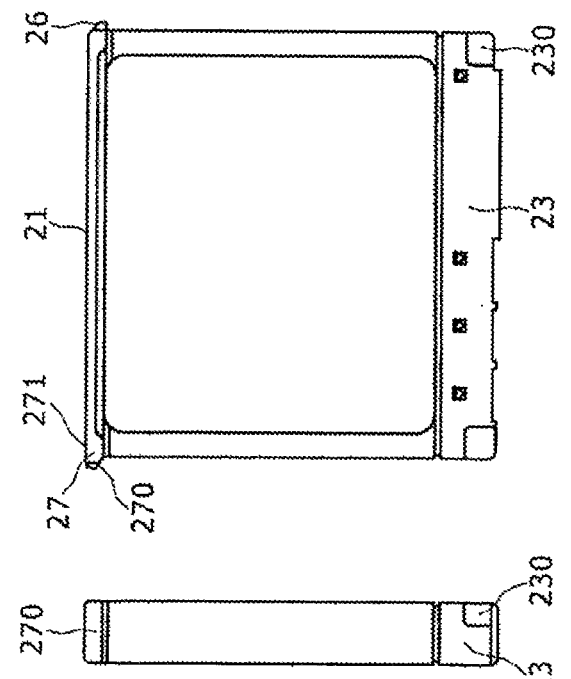
Figure 2E:
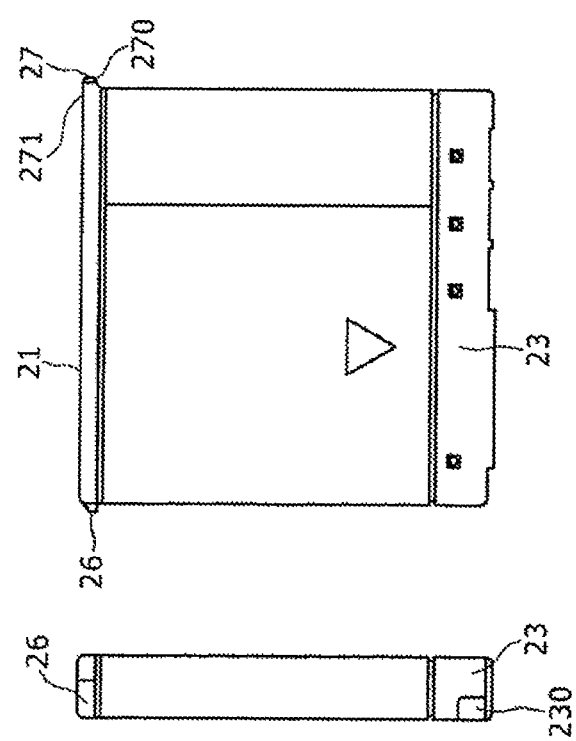
Figure 2F:
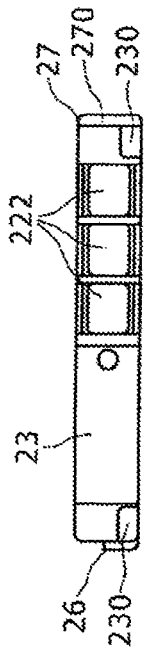
Figure 4:
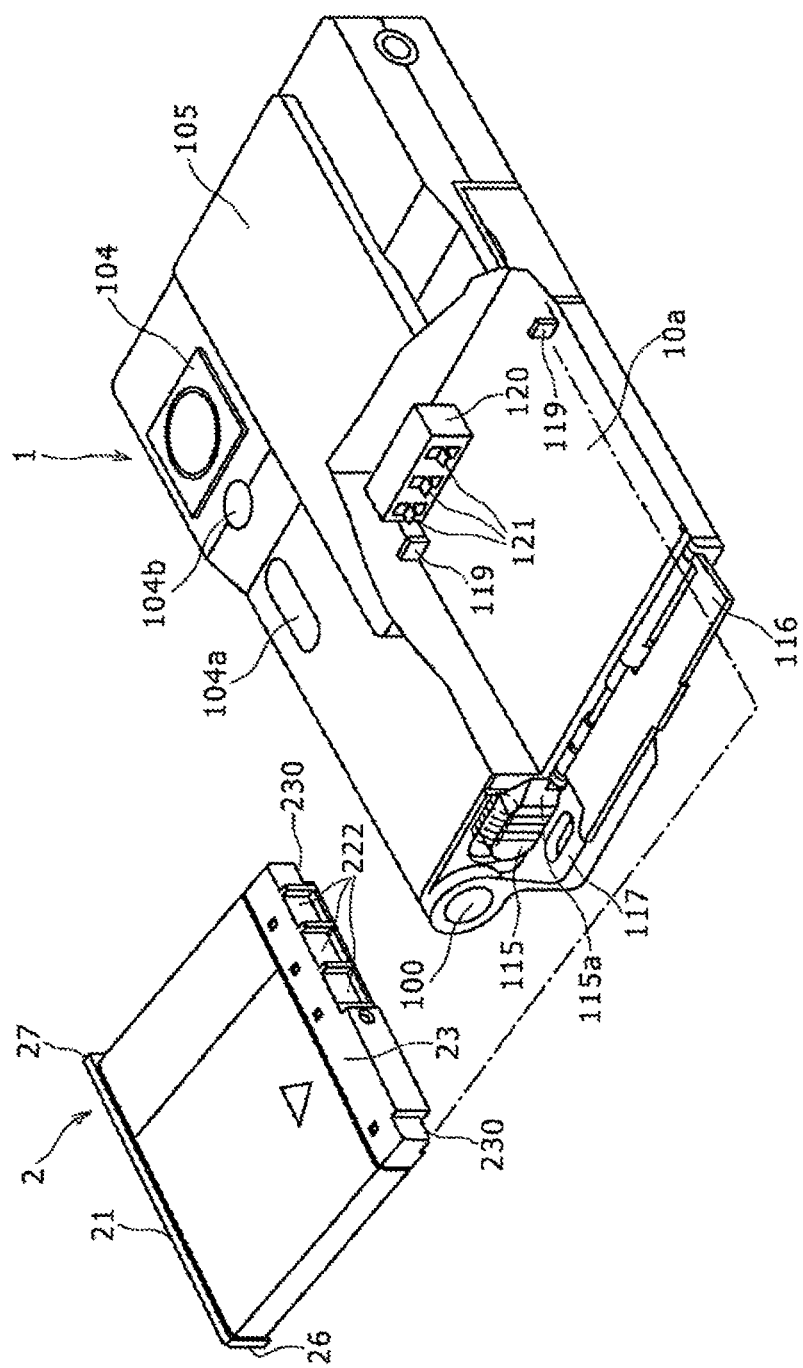
[FIG. 4]
Figure 5:
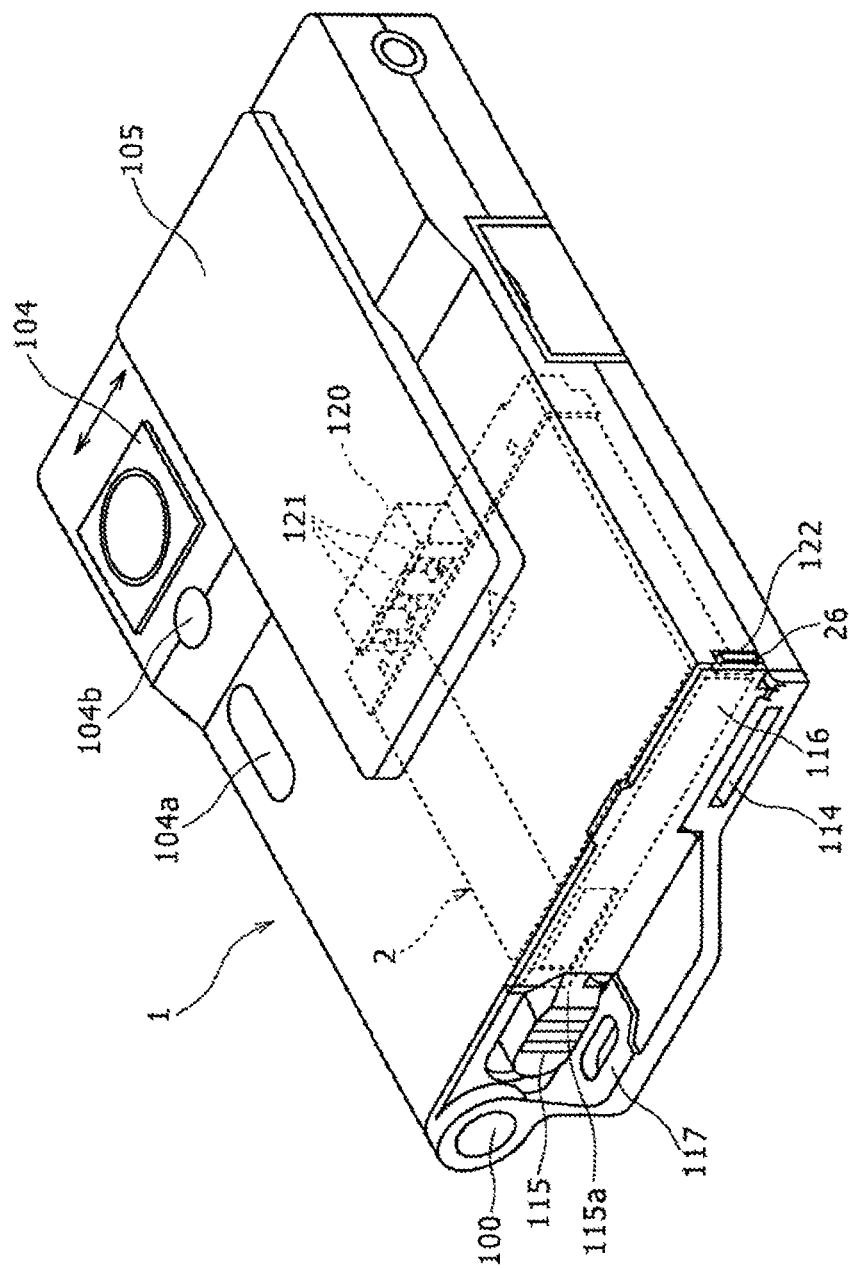
[FIG. 5]

FIG. 1 includes schematic views depicting an embodiment of an imaging device attached with a battery of the present, invention, in particular, FIG. 1A is a schematic view depicting the front of the imaging device, and FIG. 1B is a schematic view depicting the back of the imaging device. FIG. 2 includes schematic views depicting an embodiment of the battery to be attached to the imaging device, and in particular, FIGS. 1A through 1F are schematic views depicting the side surfaces of the battery according to the embodiment. FIG. 3 is an exploded perspective view of the battery. FIG. 4 is a schematic view depicting the inside of the imaging device housing the battery therein. FIG. 5 is a schematic view of the imaging device attached with the battery. FIG. 6 is a view for assistance in explaining a procedure for inserting the battery into the imaging device.

Referring to FIG. 1A, the imaging device 1 includes a zoom lever 101, a shutter button 102 and a microphone 103 located on an upper surface portion of a main body 10. In addition, referring to FIG. 4, the imaging device 1 includes an imaging lens 104, a flash 104a, an AF illuminator 104b and a lens cover 105 located on a front portion of the main body 10. The lens cover 105 slidably covers the imaging lens 104, the flash 104a and the AF illuminator 104b. The AF illuminator 104b emits auxiliary light for focusing in a dark place.

Referring to FIG. 1B, the imaging device 1 includes a mode selection switch 106, a monitor 107, a menu button 108, a control button 109, a screen display button 110, a screen size selection/screen-erasing button 111, a speaker 112 and a reset button 113 located on the back portion, of the main body 10. The control button 109 consists of a flash button 109a, a review button 109b, a self timer button 109c, a macro button 109d and a decision button 109e. These constituent elements may adopt those equipped in a known digital camera (e.g., a digital camera DSC-T3 manufactured by Sony Corporation).

The imaging device 1 includes a housing portion 10a for housing the battery 2 as shown in FIG. 4. Referring to FIG. 5, the imaging device 1 includes, on a lateral surface portion on a battery insertion side, a power button 100, a multi-terminal 114, a locking claw 115 serving as means for retaining the battery 2 when the battery 2 is inserted and attached inside the imaging device 1, a lid 116 serving as means for sealing the battery 2 attached, a strap lug 117 used to hold the imaging device 1 and an opening portion 118 (FIG. 6) adapted to receive the battery 2. Incidentally, the strap lug 117 also serves to facilitate holding the digital camera by placing a thumb thereon.

The housing portion 10a is provided with ribs 119 and a terminal plate 120. The terminal plate 120 has spring-elastic terminals 121. The ribs 119 come into contact with respective recessed portions 230 (FIG. 2) formed in the battery 2 when the battery 2 is housed in the housing portion 10a. The terminals 121 are electrically connected to respective terminal contact portions 222 (FIG. 2) of the battery 2 when the battery 2 is housed in the housing portion 10a.

Figure 13:
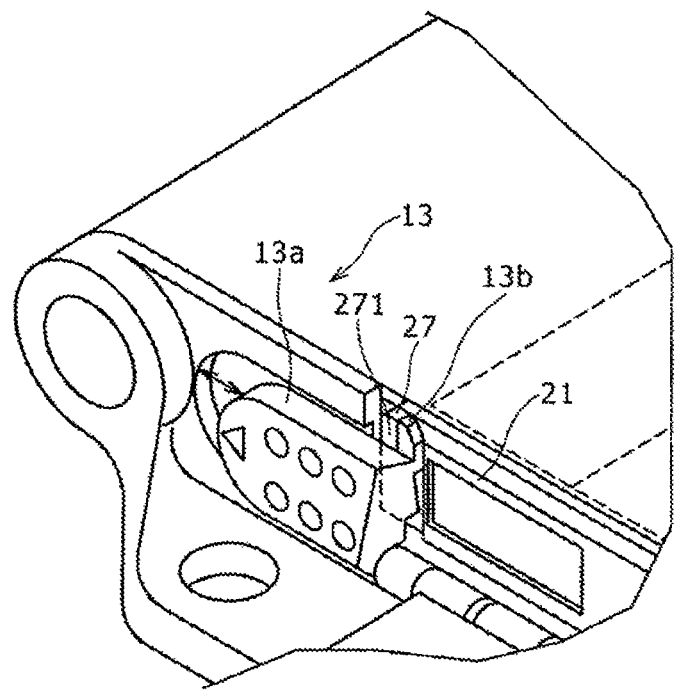
[FIG. 13]
Figure 14:
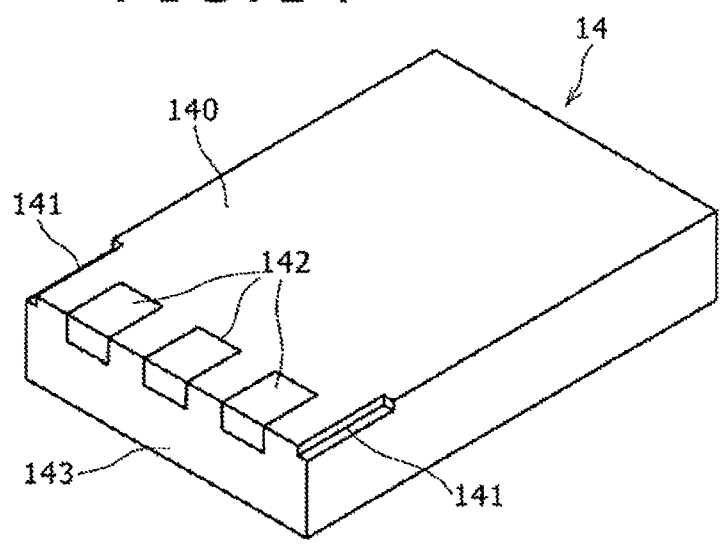
[FIG. 14]

The locking claw 115 is provided movably in arrow directions of FIG. 6 and biased in the direction of the opening portion 118 by a spring 115b shown in FIG. 7. The locking claw 115 shown in the figure is formed with an inclined surface 115a. The inclined surface 115a serves to compensate for the discharged amount of the battery 2. More specifically, when the battery 2 is unloaded from the imaging device 1, the locking claw 115 pressed by the contact pressure of the spring 115b slides under a projecting portion 27 formed on a frame portion 21 of the battery 2 with the aid of the inclined surface 115a, thereby accelerating the discharge of the battery Z. It should be noted that the locking claw 115 needs only to retain the battery attached to the imaging device 1; therefore, it is not necessarily formed with the inclined surface 115a, that is, the locking claw may foe formed, as shown in FIG. 13. A locking claw 13 is provided with a retaining portion 13a which is movable in a reciprocative manner by elastic deformation of a spring having the same configuration as the spring 115b. The retaining portion 13a is farther provided with an auxiliary retaining portion 13b.

Referring to FIG. 3, the battery 2 includes a battery cell 20 having an almost-square main surface; a rectangular frame portion 21 housing the battery cell 20 therein; and a circuit board portion 22 disposed on the external surface of the frame portion 21. The battery 2 further includes a cap portion 23 which is attached to one end side of the frame portion 21 and the battery cell 20 so as to put the circuit board portion 22 between the external surface of the frame portion 21 and the cap portion 23; and an external package film 24 integrally covering the battery ceil 20 and the frame portion 21.

The battery cell 20 is formed by covering a laminated body (a battery element) with a film-like external package member. The laminated body is formed by sequentially laminating, for example, a positive pole piece, a separator, a negative pole piece and the like. Referring to FIG. 2, the battery cell 20 is formed in a fiat almost-rectangular parallelepiped by a first through fourth lateral surfaces 20a to 20d, and front and rear surfaces 20e, 20f. The battery cell 20 is projectingly formed with a cell positive electrode portion 201 at an almost central portion of the first lateral surface 20a. In addition, the battery cell 20 is formed with a cell negative electrode portion (not shown) at a central portion of the second lateral surface 20b on the opposite side of the first lateral surface 20a. One end of a positive temperature coefficient, thermistor (hereinafter, referred to as the PTC tab) 202 is connected to the cell negative electrode portion. The PTC tab 202 acts as a safety component adapted to establish non-conduction at the time of high temperature. The other end of the PTC tab 202 terminates at the third lateral surface 20c of the battery ceil 20. An insulating paper 203 is interposed between the third lateral surface 20c of the battery cell 20 and the PTC tab 202.

The frame portion 23, is made of an electrically insulating synthetic resin and formed like a quadrate frame. The first through fourth sides 21a to 21d of the frame portion 21 ate respectively superposed on the external surfaces of the first through fourth lateral surfaces 20a through 20d of the battery ceil 20.

The first side 21a of the frame portion 21 superposed on the first lateral face 20a of the battery cell 20 is formed with a cell positive electrode portion fitting window 211. The cell positive electrode portion fitting window 211 is adapted to receive the ceil positive electrode portion 201 fitted thereinto. The third side 21c superposed on the third lateral surface 20c of the battery cell 20 is formed with a notched portion 212 that an end of the PTC tab 202 faces. In addition, the third side 21c is formed with a slit 214, at the end thereof close to the first side 21a, adapted to introduce a negative electrode tab 213 inside the third side 21c. A spacer 212a is attached to the notched portion 212.

The frame portion 21 is formed at its bottom portion with a flange-like projection 215 adapted to support the bottom of the battery cell 20. In addition, the frame portion 21 is formed at its upper portion with a flange-like projection 216 which extends along the upper edge of the second side 21b and faces the flange-like projection 215. An end portion of the battery cell 20 on the side of the second lateral surface 20b of the battery ceil 20 is gripped between the projections 215, 216.

The height, of the second side 21b of the frame portion 21 is set equal to the height (thickness) of the housed battery cell 20 encountered at the time of charging or of most expansion resulting from high temperatures.

The first side 21a of the frame portion 21 is provided with a circuit board attachment portion 217 on its external surface. The circuit board attachment portion 217 is formed between a pair of upper and lower cap support portions 218 which is projectingly formed at upper and lower ends, respectively, of the external surface of the first side 21a included in the frame portion 21. The cap support portion 218 is provided with a plurality of cap portion retaining claws 219.

The circuit board portion 22 includes a base plate 221, a plurality of terminal contact sections 222, electronic components and a transfer mold 223. The base plate 221 is formed of an insulative synthetic resin such as glass epoxy phenol, etc. The terminal contact sections 222 are attached to the external surface side of the base plate 221. The electronic components and the transfer mold 223 which molds the electronic components therein are attached to the interior surface side of the base plate 221. The circuit board portion 22 is fixedly assembled and put between the frame portion 21 and the cap portion 23 with a preset (slight) gap defined between a leading end of the transfer mold 223 and the frame portion 21.

One end portion 225a of a positive electrode tab 225 is joined by welding to a terminal portion 224 formed at one end of the circuit board portion 22. The other end ox the positive electrode tab 225 is joined to the cell positive electrode portion 201 by welding. An insulating paper 226 is interposed between the circuit board portion 22 and the positive electrode tab 225. One end 213a of the negative electrode tab 213 is joined to a terminal portion 227 formed at the other end of the circuit board 22 by welding.

The positive electrode tab 225 is made of a metal plate such as a nickel plate, etc. and formed like an almost-L shape. The metal plate is subjected to the so-called annealing to facilitate bending. The almost-L shaped positive electrode tab 225 has a long side connected to the positive electrode tab 225 and a short side connected to the terminal portion 227 formed at the one end of the circuit board portion 22.

Similarly, the negative electrode tab 213 is made of a metal plate such as a nickel plate, etc. and formed like an almost-L shape. The almost-L shaped negative electrode tab 213 has one end 213a, formed at its short side, connected to the terminal portion 227 formed at the other end of the circuit board portion 22. In addition, the negative electrode tab 213 has the other end 213b, formed at its long side, which is led to the inner surface side of the frame portion 21 via a slit 214 formed in the third side 21c of the frame portion 21 and is connected to the PTC tab 202.

The cap portion 23 includes a rectangular end face portion 231 and a tubular portion 232. The end face portion 231 is superposed an the external surface of the first side 21a of the frame portion 21 via the circuit board portion 22 (with the circuit board portion 22 sandwiched between the end face portion 231 and the external surface of the first side 21a) attached to the circuit board portion attachment portion 217. The tubular portion 232 is contiguous to the end face portion 231 and is fitted to the one end side of the frame portion 21 and the battery cell 20.

The end face portion 232 of the cap portion 23 is formed with a plurality of terminal windows 233 that the terminal contact portions 222 of the circuit board portion 22 face. The tubular portion 232 is formed with a plurality of claw engaging holes 234 in the upper and lower surface thereof. The claw engaging holes 234 are each engaged with a corresponding one of the cap portion retaining claws 219 provided on the pair of upper and lower cap portion support portion 218 of the frame portion 21.

As shown in FIG. 3, the pair of upper and lower cap support portions 218 of the frame portion 21 are provided with a plurality of projections 218a projecting toward the circuit board portion 22. The projections 218a come into abutment against the circuit board portion 22 at positions where the transfer mold 223 is sandwiched between the circuit board portion 22 and the projections 218a and at portions on which the electronic components are not mounted, when the terminal contact portion 222 of the circuit board portion 22 is pressurized by the counterpart terminals.

The external package film 24 is made of a synthetic resin such as polyethylene (PE), polyethylene terephthalate (PET), polycarbonate (PC), etc. and formed into a sheet having a thickness of about 0.05 to 0.1 mm. The battery cell 20 is housed in the frame portion 21, the circuit board portion 22 and the like are attached to the frame portion 21, and the cap portion 23 is covered thereon. Thereafter, the external package film 24 is wound around the frame portion 21 to cover the front and back surfaces of the battery cell 20 and integrally unites the battery cell 20, the frame portion 21 and the cap portion 23. Incidentally, a model plate film 25 is attached to the external package film 24.

The frame portion 21 is formed on the edge portions of the second side 21b with projecting portions 26, 27 which extend in the length direction of the side. This makes it possible to prevent the erroneous insertion of the battery 2 into the imaging device 1.

As shown in FIG. 2, the projecting portion 26 is formed in an almost rectangular parallelepiped. The imaging device 1 is formed on its lateral surface with a notched portion 122 which is adapted to receive the projecting portion 26 exposed to the outside when the battery 2 is loaded on the imaging device 1. The notched area of the notched portion 122 is set equal to or greater than the installation area of the projecting portion 26 relative to the frame portion 21 of the battery 2.

As shown in FIG. 2, the projecting portion 27 is formed in an almost trapezoid in cross-section to have an inclined surface 270. In addition, the projecting portion 27 is formed with a to-be-retained surface 271 which is retained by the locking claw 115 when the battery 2 is loaded on the imaging device 1 and the locking claw 115 retains the battery 2.

Setting the height of the to-be-retained, surface 271 at a level lower than the surface of the frame portion 21 makes clear the portion retained by the locking claw 115. In addition, the locking claw 115 undergoing the contact pressure of the spring 115b can be restrained. The to-be-retained surface 271 has a smaller frictional coefficient than the peripheries of the to-be-retained surface 271. This makes clearer the portion to be retained. Further, the locking claw 115 becomes slipperier; therefore, it is restrained quickly.

Inserting operation of the battery 2 is described with reference to FIGS. 6 to 9.

Figure 7A:
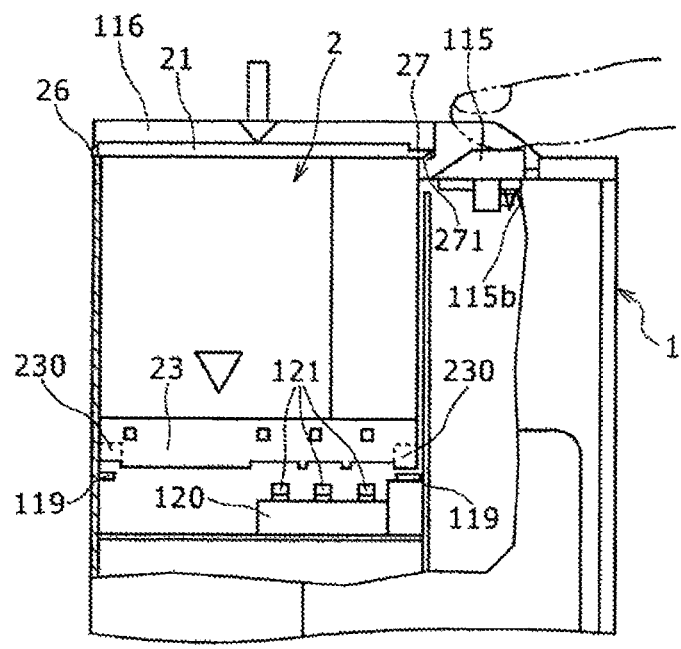
[FIG. 7]
Figure 7B:
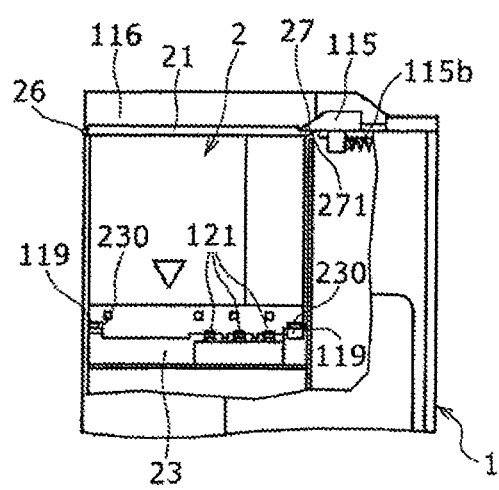
Figure 7C:
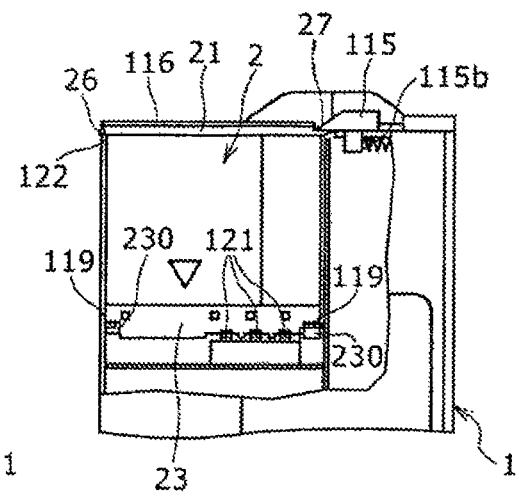

As shown in FIG. 6, the battery 2 is inserted into the imaging device 1 with the surface of the battery 2 having the terminal contact sections 222 facing the opening portion US of the imaging device 1. At this time, as shown in FIG. 7A, the battery 2. is inserted into the imaging device 1 with the locking claw 115 pulled with a finger. As shown in FIG. 7B, the bottoms of the recessed portions 230 of the battery 2 come into contact with the ribs 119 in the imaging device 1 and the battery 2 is fitted into the imaging device 1. At this time, the locking claw 115 is released from the finger, being slid on the to-be-retained surface 271 in the direction of the battery 2 by the contact pressure of the spring 115b, and retains the to-be-retained surface 271, thereby retaining the battery 2. Thereafter, as shown in FIG. 7C, the lid 116 is closed to seal the battery 2 in the imaging device 1. At this time, the terminals 121 provided on the terminal plate 120 of the imaging device 1 are each brought into electrical connection with a corresponding one of the terminal contact portions 222 of the battery 2 while being compressed resulting from elastic deformation.

Figure 8A:
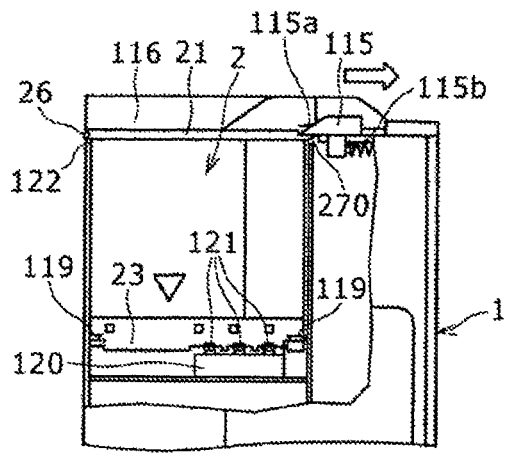
[FIG. 8]
Figure 8B:
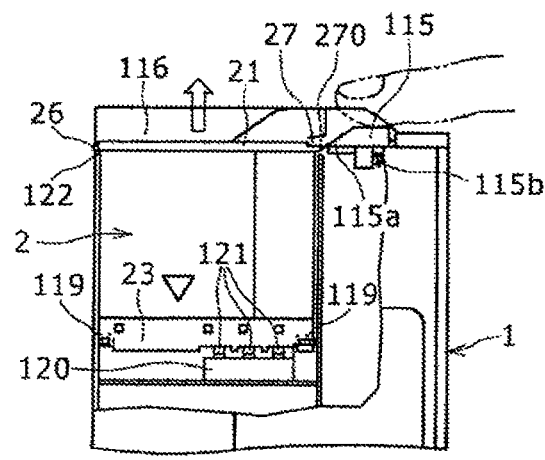
Figure 8C:
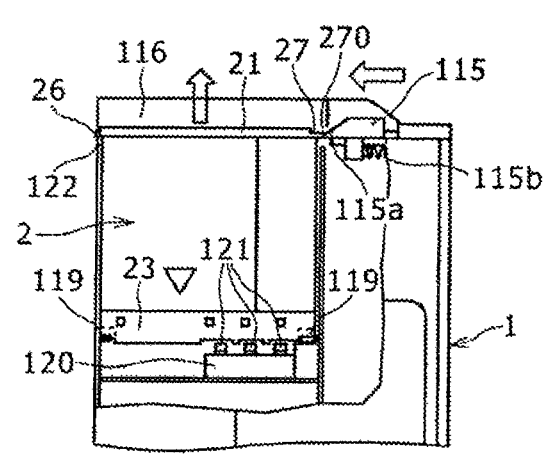

Nest, when the battery 2 is to be removed, as shown in FIG. 8A, the locking claw 115 is pulled with a finger (not shown) in a direction of lateral arrow. As a result, as shown in FIG. 8B, the battery 2 undergoes the contact pressure of the terminals 121 on the terminal plate 120 to project in the direction of arrow. When released from the finger, the locking claw 115 is biased by the spring 115b urging it in the direction of the opening portion 118 (FIG. 6) to move in the direction of lateral arrow as shown in FIG. 8C. At this time, since the projecting portion 26 of the battery 2 is exposed to the outside of the imaging device 1, the battery 2 can be easily taken out by placing fingers on the projecting portions 26, 27. If the locking claw 115 is formed with the inclined surface 115a, the locking claw 115 is slid under the projecting portion 27 while the inclined surface 115a is brought into contact with the inclined surface 270 of the projecting portion 27. Thus, the discharged amount of the battery 2 can be compensated for so that the battery 2 further projects. This makes it possible to take out the battery 2 further easily.

Figure 9A:
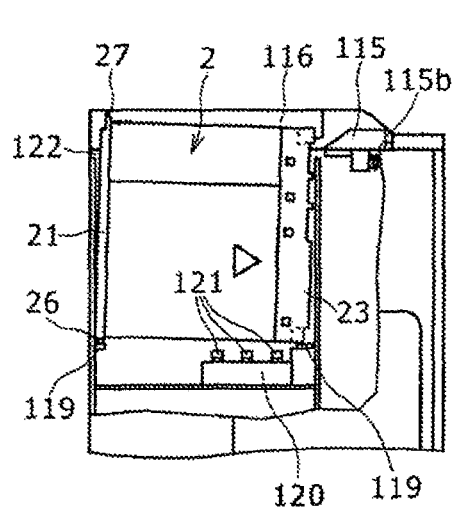
[FIG. 9]
Figure 9C:
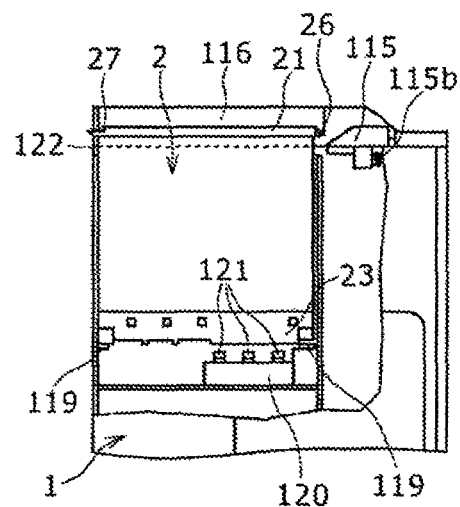
Figure 9B:
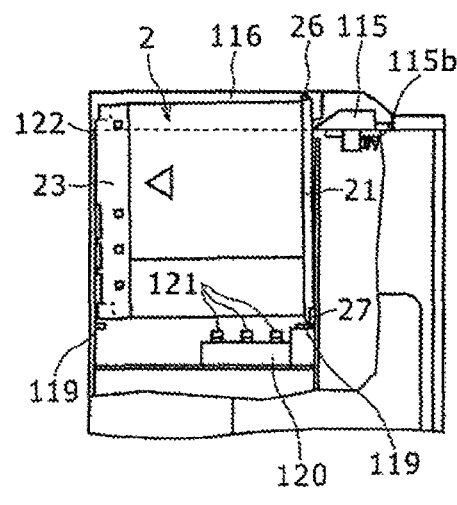

On the other hand, as shown in FIGS. 9A and 9B, if the battery is laterally erroneously inserted into the imaging device 1, the projecting portion 26 meets one of the ribs 119 and the lateral surface of the cap portion 23 meets the other rib 119. In this case, since a portion of the battery 2 protrudes from the main body of the imaging device 1, the locking claw 115 cannot retain the battery 2 and. the lid 116 cannot close the opening portion 118.

As shown in FIG. 9C, if the battery 2 is inserted into the imaging device 1 upside down, the ends of the cap portion 23 of the battery 2 meet the ribs 119. Also in this case, since a portion of the battery 2 protrudes from the main body of the imaging device 1, the locking claw 115 cannot retain the battery 2 and the lid 116 cannot close the opening portion 118.

Figure 9D:
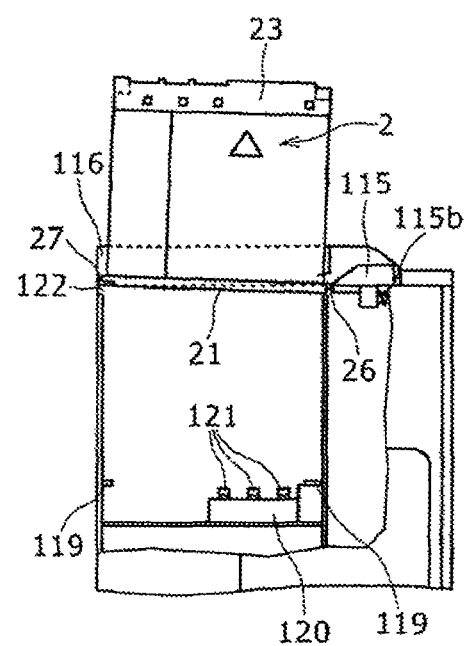

As shown in FIG. 9D, if the battery 2 is inserted into the imaging device 1 in a back-to-front manner, the projecting portions 26, 27 of the battery 2 meet the edge of the opening 118 of the imaging device 1 so that the battery 2 cannot be inserted into the imaging device 1. Consequently, the locking claw 115 cannot retain the battery 2 and the lid 116 cannot close the opening portion 118.

As described above, the battery 2 is prevented from being erroneously inserted into the imaging device 1, so that any damage to the terminals 121 of the imaging device 1 resulting from erroneous insertion of the battery 2 can be avoided.

A battery 2A according to an embodiment shown in FIG. 10 may be formed at both ends of a cap portion 23 with projecting portions 28, 29 which project in the direction of insertion and differ from each other in shape. This can prevent erroneous insertion of the battery 2A into the imaging device 1. The projecting portion 28 is formed almost trapezoid in cross-section and the projecting portion 29 is formed in an almost rectangular parallelepiped.

The inserting operation of the battery 2A is described with reference to FIGS. 11 and 12.

Figure 11:
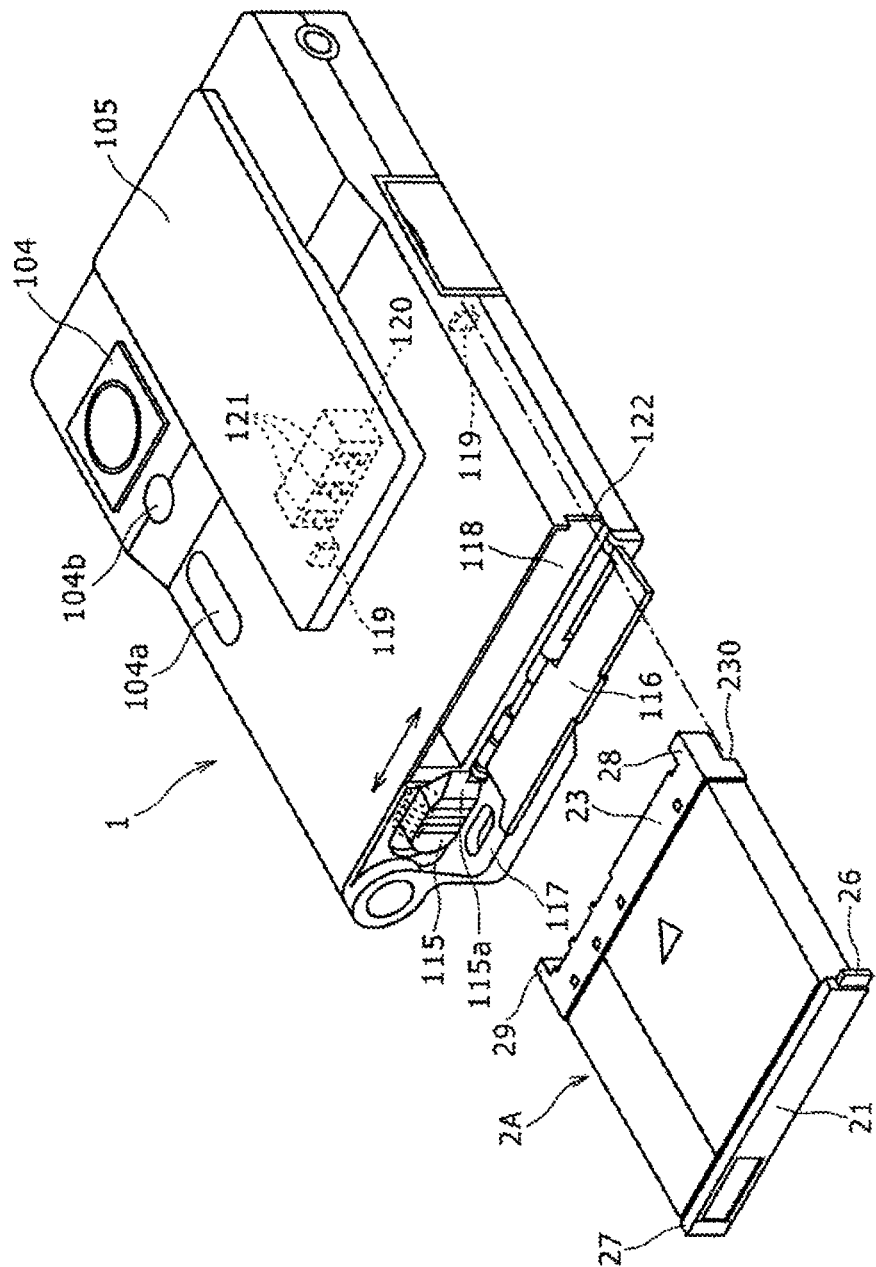
[FIG. 11]

As shown in FIG. 11, with the locking claw 115 pulled with a finger in the direction of arrow, the battery 2A is inserted into the imaging device 1 while the surface of the battery 2A having the terminal windows 233 faces the opening portion 118 of the imaging device 1. As shown in FIG. 12A, the bottoms of the recessed portions 230 of the battery 2A come into contact with the ribs 119 in the imaging device 1 and the battery 2 is fitted into the imaging device 1. At this time, the locking claw 115 is released from the finger, being slid on the to-be-retained surface 271 in the direction of the battery 2A by the contact pressure of the spring 115b, and retains the to-be-retained surface 271, thereby retaining the battery 2A. Thereafter, the lid 116 is closed to seal the battery 2A in the imaging device 1. At this time, the terminals 121 provided on the terminal plate 120 of the imaging device 1 are each brought into electrical connection with a corresponding one of terminal contact portions 222 of the battery 2A while being compressed resulting from elastic deformation.

As shown in FIG. 12B, if the battery 2A is inserted into the imaging device 1 upside down, each of the projecting portions 28, 29 of the battery 2A meets a corresponding one of the ribs 119. In this case, since a portion of the battery 2A protrudes from the main body of the imaging device 1, the locking claw 115 cannot retain the battery 2A and the lid 116 cannot close the opening portion 118. In addition, the distance between the cap portion 23 of the battery 2A and the ribs 119 of the imaging device 1 is maintained to an extent that both do not come into contact with each other.

As shown in FIG. 12C, if the battery 2A is laterally erroneously inserted into the imaging device 1, the projecting portion 26 of the battery 2A meets the lip of the opening 118 of the imaging device 1 so that the battery 2A cannot be inserted into the imaging device 1. The looking claw 115 can-not retain the battery 2 and the lid 116 cannot close the opening portion 118.

As described above, the battery 2A can be prevented from being erroneously inserted into the imaging device 1, so that any damage to the terminals 121 of the imaging device 1 resulting from the erroneous insertion of the battery can be avoided.

Like the batteries 2, 2A, even a battery having an almost square main surface can be prevented from being erroneously inserted. In addition, the battery and the terminal of a device attached with the battery can be protected, this device can be downsized, and mounting flexibility can be enhanced.

The batteries 2, 2A described in the above embodiments are applied to the imaging device 1. However, application of the battery according to the present invention is not limited to imaging devices and the battery can be applied to devices which need a battery, other than the imaging device.

The invention claimed is:

1. A flat almost-rectangular parallelepipedic battery which is formed with a back frame portion and a first side surface connected to and substantially perpendicular to the back frame portion, the back frame portion having a thickness extending towards an insertion surface of the battery, the back frame portion also having first and second projecting portions having different shapes from one another located at both longitudinal ends of the back frame portion and being within the thickness of the back frame portion, the first and second projecting portions being located in a plane substantially perpendicular to the first side surface, the back frame portion being opposite to the insertion surface of the battery inserted into a device.

2. The battery according to claim 1, wherein the first projecting portion of the battery has a to-be-retained surface retained by a retaining portion provided for the device adapted to receive the battery inserted thereinto, and the to-be-retained surface is set to a level lower than the back frame portion.

3. The battery according to claim 2, wherein the to-be-retained surface is a surface having a frictional coefficient smaller than that of a portion of the back frame portion other than the to-be-retained surface.

4. The battery according to claim 3, wherein the first projecting portion having the to-be-retained surface has an inclined surface acutely inclined with respect to the back frame portion.

5. The battery according to claim 1 which is formed with projecting portions having different shapes from one another projecting in an inserting direction at both end portions of the insertion surface.

6. The battery according to claim 1 which has an almost square main surface.

7. A flat almost-rectangular parallelepipedic battery which is formed with a back frame portion having a thickness extending towards an insertion surface of the battery, the back frame portion having first and second projecting portions having different shapes from one another located at both longitudinal ends of the back frame portion and being within the thickness of the back frame portion, the back frame portion being a surface opposite to the insertion surface of the battery inserted into a device, the insertion surface including projecting portions having different shapes from one another projecting in an inserting direction at both end portions of the insertion surface.

8. The battery according to claim 7, wherein the insertion surface further includes a plurality of terminal contact portions.

9. The battery according to claim 7, wherein a width of the second projecting portion is less than a remaining width of the back frame portion.

10. A flat almost-rectangular parallelepipedic battery which is formed with a back frame portion and a first side surface connected to and substantially perpendicular to the back frame portion, the back frame portion having a thickness extending towards an insertion surface of the battery, the back frame portion also having first and second projecting portions having different shapes from one another located at both longitudinal ends of the back frame portion and being within the thickness of the back frame portion, the first and second projecting portions being located in a plane substantially perpendicular to the first side surface, the back frame portion being opposite to the insertion surface of the battery inserted into a device, the insertion surface including projecting portions having different shapes from one another projecting in an inserting direction at both end portions of the insertion surface.

11. The battery according to claim 10, wherein the insertion surface further includes a plurality of terminal contact portions.

12. The battery according to claim 10, wherein a width of the second projecting portion is less than a remaining width of the back frame portion.

* * * * *